United States Patent
Roos

(10) Patent No.: US 10,421,454 B2
(45) Date of Patent: Sep. 24, 2019

(54) METHOD AND SYSTEM FOR PROPULSION OF A VEHICLE

(71) Applicant: Scania CV AB, Södertälje (SE)

(72) Inventor: Fredrik Roos, Segeltorp (SE)

(73) Assignee: Scania CV AB, Södertälje (SE)

( * ) Notice: Subject to any disclaimer, the term of this patent is extended or adjusted under 35 U.S.C. 154(b) by 334 days.

(21) Appl. No.: 15/513,013

(22) PCT Filed: Sep. 29, 2015

(86) PCT No.: PCT/SE2015/051025
§ 371 (c)(1),
(2) Date: Mar. 21, 2017

(87) PCT Pub. No.: WO2016/064327
PCT Pub. Date: Apr. 28, 2016

(65) Prior Publication Data
US 2017/0297572 A1  Oct. 19, 2017

(30) Foreign Application Priority Data
Oct. 20, 2014  (SE) ..................... 1451252

(51) Int. Cl.
*B60W 30/14* (2006.01)
*B60W 10/06* (2006.01)
(Continued)

(52) U.S. Cl.
CPC ............ *B60W 30/14* (2013.01); *B60W 10/06* (2013.01); *B60W 30/143* (2013.01);
(Continued)

(58) Field of Classification Search
CPC .... B60W 30/14; B60W 30/188; B60W 10/06; B60W 40/076; B60W 50/00
(Continued)

(56) References Cited

U.S. PATENT DOCUMENTS

| | | | |
|---|---|---|---|
| 8,696,517 B2 * | 4/2014 | Whitney | F02D 41/023 477/107 |
| 2011/0130902 A1 * | 6/2011 | Heisel | B60K 6/485 701/22 |
| 2013/0297174 A1 | 11/2013 | Lacaze et al. | |

FOREIGN PATENT DOCUMENTS

| | | |
|---|---|---|
| DE | 102009030784 A1 | 2/2010 |
| DE | 102012210317 A1 | 12/2013 |

(Continued)

OTHER PUBLICATIONS

Korean Office Action for Korean Patent Application No. 10-2017-7012777 dated Oct. 20, 2018.

(Continued)

*Primary Examiner* — Tan Q Nguyen
(74) *Attorney, Agent, or Firm* — Moore & Van Allen PLLC; W. Kevin Ransom

(57) ABSTRACT

Provided is a method for propulsion of a vehicle, said vehicle comprising at least one power source for providing power to at least one drive wheel of said vehicle. The method includes, when said vehicle is to be driven along a first path: determining a torque profile for use in controlling said first power source when driving said vehicle along at least a first segment of said first path; determining said torque profile on the basis of an estimated representation of a demand for torque when driving said vehicle along said first segment; when determining said torque profile, reducing variations in torque delivered by said power source by allowing increased variations in speed of said vehicle; and when said vehicle is driven along said first segment of said first path, controlling torque delivered by said at least one power source according to said determined torque profile.

18 Claims, 5 Drawing Sheets

(51) Int. Cl.
  *B60W 50/00* (2006.01)
  *B60W 30/188* (2012.01)
  *B60W 40/076* (2012.01)
  *B60W 30/00* (2006.01)

(52) U.S. Cl.
  CPC ...... *B60W 30/188* (2013.01); *B60W 30/1882* (2013.01); *B60W 40/076* (2013.01); *B60W 50/0097* (2013.01); *B60W 30/00* (2013.01); *B60W 50/00* (2013.01); *B60W 2520/10* (2013.01); *B60W 2550/143* (2013.01); *B60W 2550/402* (2013.01); *B60W 2710/0666* (2013.01)

(58) Field of Classification Search
  USPC .......................................................... 701/99
  See application file for complete search history.

(56) References Cited

FOREIGN PATENT DOCUMENTS

| | | |
|---|---|---|
| WO | 2009156318 A1 | 12/2009 |
| WO | 2011133095 A1 | 10/2011 |
| WO | 2013095232 A1 | 6/2013 |
| WO | 2013095233 A1 | 6/2013 |
| WO | 2014149043 A1 | 9/2014 |

OTHER PUBLICATIONS

European Search Report from the European Patent Office for PCT/SE2015/051025 dated Jun. 5, 2018.
International Preliminary Report on Patentability for PCT/SE2015/051025 dated Apr. 25, 2017.
Hellstrom, E. et al., "Look-ahead control for heavy trucks to minimize trip time and fuel consumption," Control Engineering P Control Engineering Practice, 2009, vol. 17, No. 2, pp. 245-254, ISSN 0967-0661; abstract.
International Search Report for PCT/SE2015/051025 dated Sep. 2, 2016.
Written Opinion of the International Searching Authority for PCT/SE2015/051025 dated Sep. 2, 2016.
Scania CV AB, Korean Application No. 10-2017-7012777, Office Action, May 10, 2019.

* cited by examiner

METHOD AND SYSTEM FOR PROPULSION OF A VEHICLE

CROSS-REFERENCE TO RELATED APPLICATION(S)

This application is a national stage application (filed under 35 § U.S.C. 371) of PCT/SE2015/051025, filed Sep. 29, 2015 of the same title, which, in turn claims priority to Swedish Application No. 1451252-9 filed Oct. 20, 2014 of the same title; the contents of each of which are hereby incorporated by reference.

FIELD OF THE INVENTION

The present invention relates to motor vehicles, and in particular to a method and a system related to propulsion of a vehicle. The present invention also relates to a vehicle, as well as a computer program product implementing the method according to the invention.

BACKGROUND OF THE INVENTION

With regard to vehicles in general, and at least to some extent commercial vehicles such as trucks, buses and the like in particular, vehicle economy has, over time, had an increasing impact on the profitability of the enterprise in which the vehicle is used. A main expense associated with vehicle operation is the consumption of fuel for propulsion of the vehicle.

The degree of utilization of heavy vehicles is often high, with associated considerable total fuel consumption, and the cost of fuel can affect the profitability of the owner of the vehicle to a great extent.

Fuel consumption is also of interest from an exhaust emission point of view. For example, governmental concern in pollution and air quality, e.g. in urban areas, has led to adoption of emission standards and rules in many jurisdictions. A reduction in fuel consumption facilitates fulfilment of emission standards and rules.

Any opportunity to reduce fuel consumption may affect profitability and reduction of emissions in a positive way.

For example, the use of cruise control systems is commonplace today. One common purpose of cruise control systems is to achieve a uniform predetermined velocity in a manner that is comfortable to the driver of the vehicle. However, there are also cruise control systems/functions that strive to adapt the propulsion of the vehicle based on knowledge about the road ahead, so that fuel consumption can be reduced. Such a reduction in fuel consumption can, for example, be achieved with the aid of cruise control functions where vehicle speed is allowed to deviate from a speed set by the driver based on knowledge about the vehicle route or other data, so as to thereby achieve a more fuel-economic propulsion of the vehicle.

For example, the vehicle speed may be reduced to some extent at the end of an uphill stretch that is followed by a downhill stretch of a type where, by means of the force of gravity, the vehicle will be reaccelerated to the desired speed.

WO 2013/095232 relates to a method for determination of at least one reference value which indicates how a vehicle's speed is to be influenced and which may be used to control at least one control system in a vehicle. The invention is characterized by performing the steps of:—making a first prediction and a second prediction of a vehicle speed along a horizon, said first prediction based on an engine torque which retards the vehicle as compared with a conventional cruise control, and said second prediction based on an engine torque which accelerates the vehicle as compared with a conventional cruise control;—comparing said respective first prediction and second prediction of the vehicle speed with a lower limit value and/or an upper limit value which delineate a range within which the vehicle's speed should be; and—determining at least one reference value based on at least one of said respective comparisons and said first prediction and second prediction of the vehicle speed along the horizon.

SUMMARY OF THE INVENTION

It is an object of the present invention to provide a method for propulsion of a vehicle by means of which, for example, fuel consumption of a vehicle being powered by a combustion engine, or energy consumption of a vehicle being powered by an electrical machine, can be reduced.

According to the present invention, it is provided a method for propulsion of a vehicle, said vehicle comprising at least one power source for providing power to at least one drive wheel of said vehicle. The method includes, when said vehicle is to be driven along a first path:
prior to said vehicle being driven along a first segment, determining a torque profile for use in controlling said first power source when driving said vehicle along at least said first segment of said first path;
determining a torque profile for use in controlling said first power source when driving said vehicle along at least a first segment of said first path;
determining said torque profile on the basis of an estimated representation of a demand for torque when driving said vehicle along said first segment;
when determining said torque profile, reducing variations in torque delivered by said power source by allowing increased variations in speed of said vehicle;
when determining said torque profile, estimating an average torque demand when driving said vehicle along said first segment;
determining said torque profile on the basis of said estimated average torque demand; and
when said vehicle is driven along said first segment of said first path, controlling torque delivered by said at least one power source according to said determined torque profile.

As was mentioned above, there is a constant desire to reduce fuel/energy consumption in the context of propulsion of vehicles, and the invention provides a method for propulsion of the vehicle that at least in some situations is capable of reducing the consumption of fuel or energy.

This is accomplished by a method where a representation of a demand for torque when driving said vehicle along said first segment is estimated. This can, for example, be accomplished by estimating the work that is required from the power source, such as e.g. a combustion engine or an electrical machine, for an upcoming segment of the path along which the vehicle is travelling, such as e.g. an upcoming stretch of road. The estimated work is then distributed over the segment of the path in a manner that reduces variations in the torque delivered by the power source at the expense of increased variations in the speed of the vehicle. That is, the propulsion of the vehicle is primarily controlled on the basis of the torque being delivered by the power source, the resulting speed of the vehicle thereby becoming a consequence of the applied torque.

The estimation of the work that is expected to be delivered by the power source can make use of data regarding the path in front of the vehicle along which the vehicle is travelling, e.g. with regard to a road profile reflecting e.g. hills, valleys and crests of the upcoming segment of the path. Use of such data allows high-accuracy estimation of the work that is required to achieve the desired movement of the vehicle along the segment of the path.

Any suitable manner for determining the demand for torque can be used, and estimating the work is one example. As alternatives to estimating the work when driving said vehicle along said first segment, for example, a representation of the expected torque to be produced by the vehicle power source can be accomplished by e.g. determining a representation of the average torque to be produced when driving said vehicle along said first segment, or a torque profile for e.g. driving said vehicle along said first segment at a set speed.

Further characteristics of the present invention and advantages thereof are indicated in the detailed description of exemplary embodiments set out below and the attached drawings.

DETAILED DESCRIPTION OF THE INVENTION

Figure 1A:
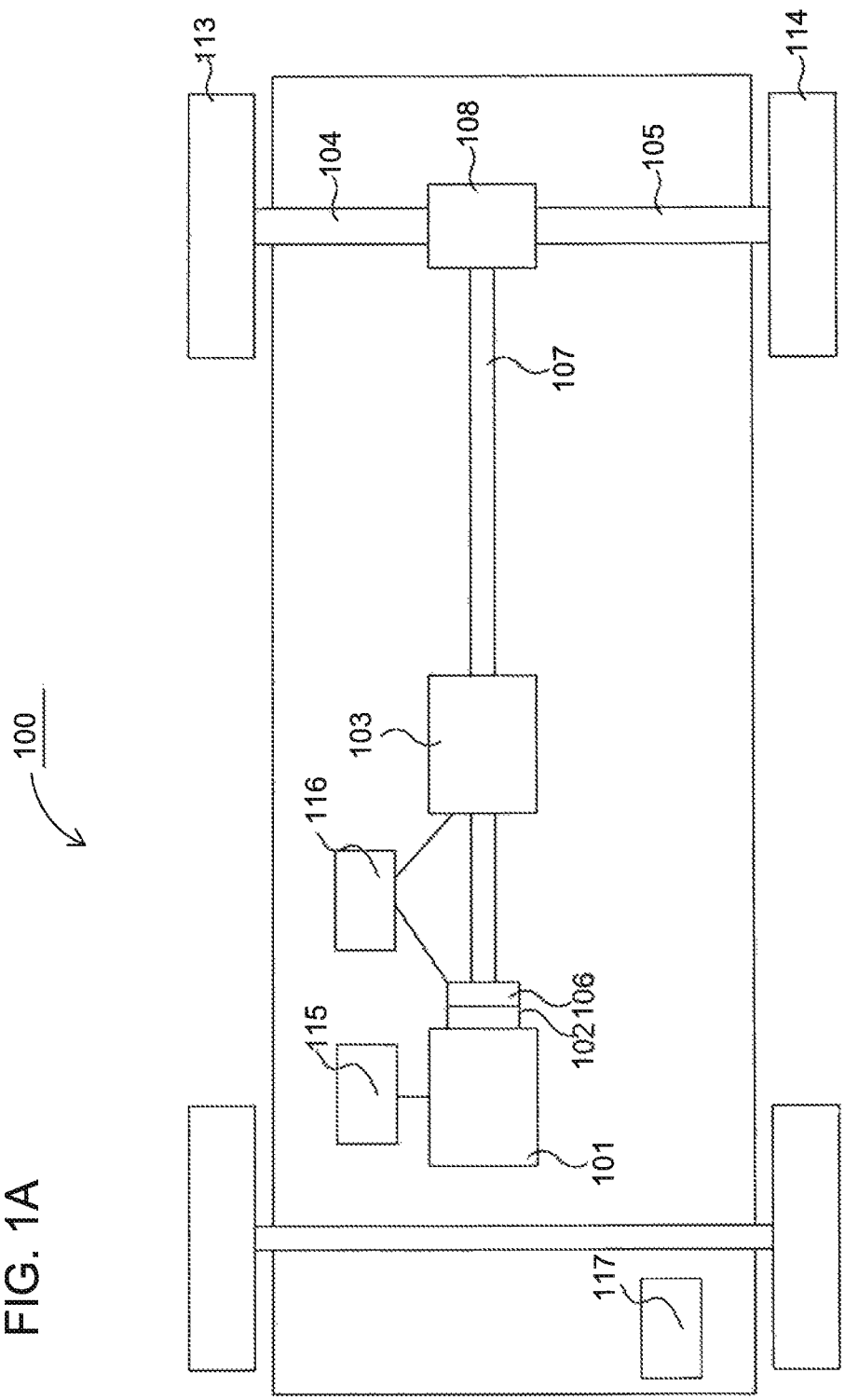
FIG. 1A shows a power train in a vehicle in which the present invention can be utilized.

FIG. 1A schematically shows a power train in a vehicle 100 according to one embodiment of the present invention. The power train comprises a combustion engine 101, which, in a conventional manner, is connected via an output shaft of the combustion engine 101, normally via a flywheel 102, to a gearbox 103 via a clutch 106. An output shaft 107 from the gearbox 103 propels drive wheels 113, 114 via a final drive 108, such as a common differential, and drive axles 104, 105 connected to said final drive 108.

The combustion engine 101 is controlled by the vehicle's control system via a control unit 115, and the clutch 106, which, for example, can be an automatically operated clutch, and gearbox 103 are also controlled by the vehicle's control system by means of a control unit 116.

In general, control systems in modern vehicles usually consist of a communication bus system comprising one or a plurality of communication buses for connecting a number of electronic control units (ECUs), or controllers, and various components arranged in the vehicle. Such a control system can comprise a large number of control units, and the responsibility for a specific function can be shared among more than one control unit.

For the sake of simplicity, FIG. 1A depicts only the control units 115, 116 and a control unit 117, but vehicles 100 of the illustrated kind are often provided with significantly more control units, as one skilled in the art will appreciate. Control units 115-117 can communicate with one another via said communication bus system, partly indicated by interconnecting lines in FIG. 1A.

The present invention can be implemented in any suitable control unit, and in the illustrated example the invention is implemented in control unit 117. The control unit 117 is responsible for one or a plurality of cruise control functions for automatically controlling the speed of the vehicle. These cruise control functions can be of various types and, for example, be of a conventional type being arranged to maintain a speed set by the driver. Cruise control functions can also be of kind that uses additional information when controlling the speed of the vehicle. For example, the cruise control can make use of a "Look Ahead" function. A "Look Ahead" cruise control (LACC) function consists of a cruise control function that uses knowledge about the upcoming section of road, i.e. knowledge about the topography of the road in front of the vehicle, in order to adapt the vehicle velocity based on variations in the road along which the vehicle is travelling.

The invention can alternatively be implemented in a control unit that is dedicated to the present invention, or wholly or partly in one or a plurality of control units already present in the vehicle 100.

The control of the torque produced by the combustion engine 101, or electrical machine as the case may be, by the control unit 117 (or the control unit(s) in which the present invention is implemented) according to the present invention will likely depend on signals that are received from the control unit(s) that control engine functions, i.e. the control unit 115 in the present example. The control unit 117 will likely also receive signals from other control units arranged in the vehicle and not shown, and/or information from, for example, various transmitters/sensors, e.g. positioning sensors, arranged in the vehicle. Generally speaking, control units of the type shown are normally arranged so as to receive sensor signals from various parts of the vehicle 100.

Control units of the type shown are also normally arranged so as to transmit control signals to various vehicle parts and components. For example, the control unit 117 can demand/order the control unit 115 to control the torque delivered by the combustion engine 101 according to a determined torque profile.

The functions of the control units are often controlled by programmed instructions which typically consist of a computer program which, when it is executed in a computer or control unit, causes the computer/control unit to exercise the desired control, such as method steps according to the present invention. The computer program usually constitutes a part of a computer program product, where said computer program product comprises a suitable storage medium 121 (see FIG. 1B) with the computer program 126 stored on said storage medium 121. The computer program can be stored in a non-volatile manner on said storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc, and be arranged in or in connection with the control unit, whereupon the computer program is executed by the control unit. The behavior of the vehicle in a specific situation can thus be adapted by modifying the instructions of the computer program.

Figure 1B:
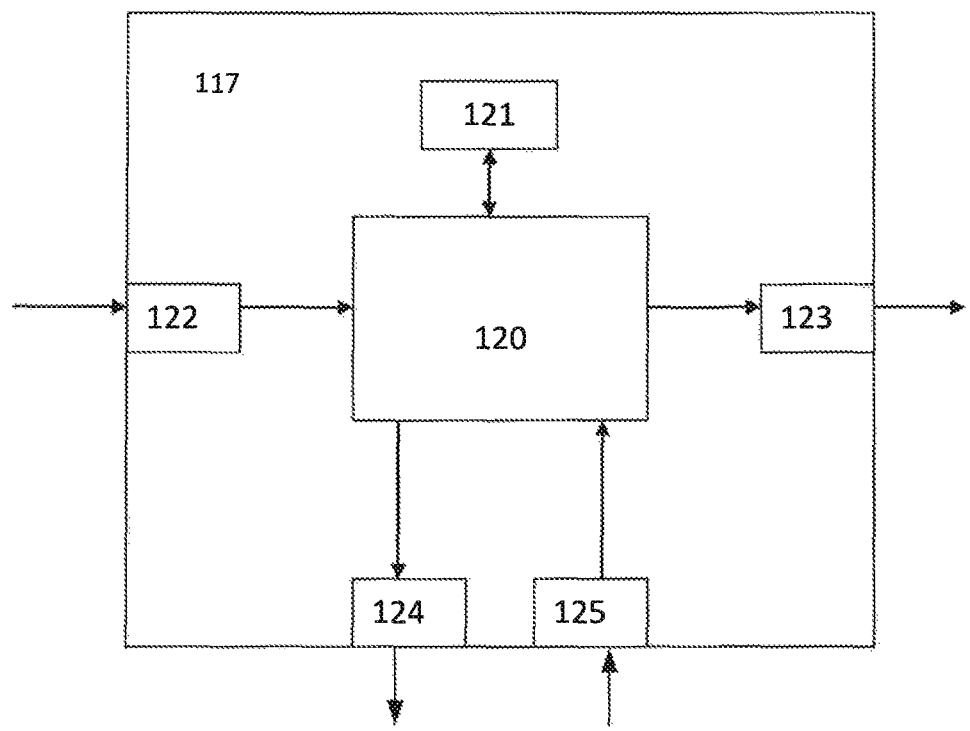
FIG. 1B shows an example of a control unit in a vehicle control system.

An exemplary control unit (the control unit 117) is shown schematically in FIG. 1B, and the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which furnishes the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 117 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component (s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

Figure 2:
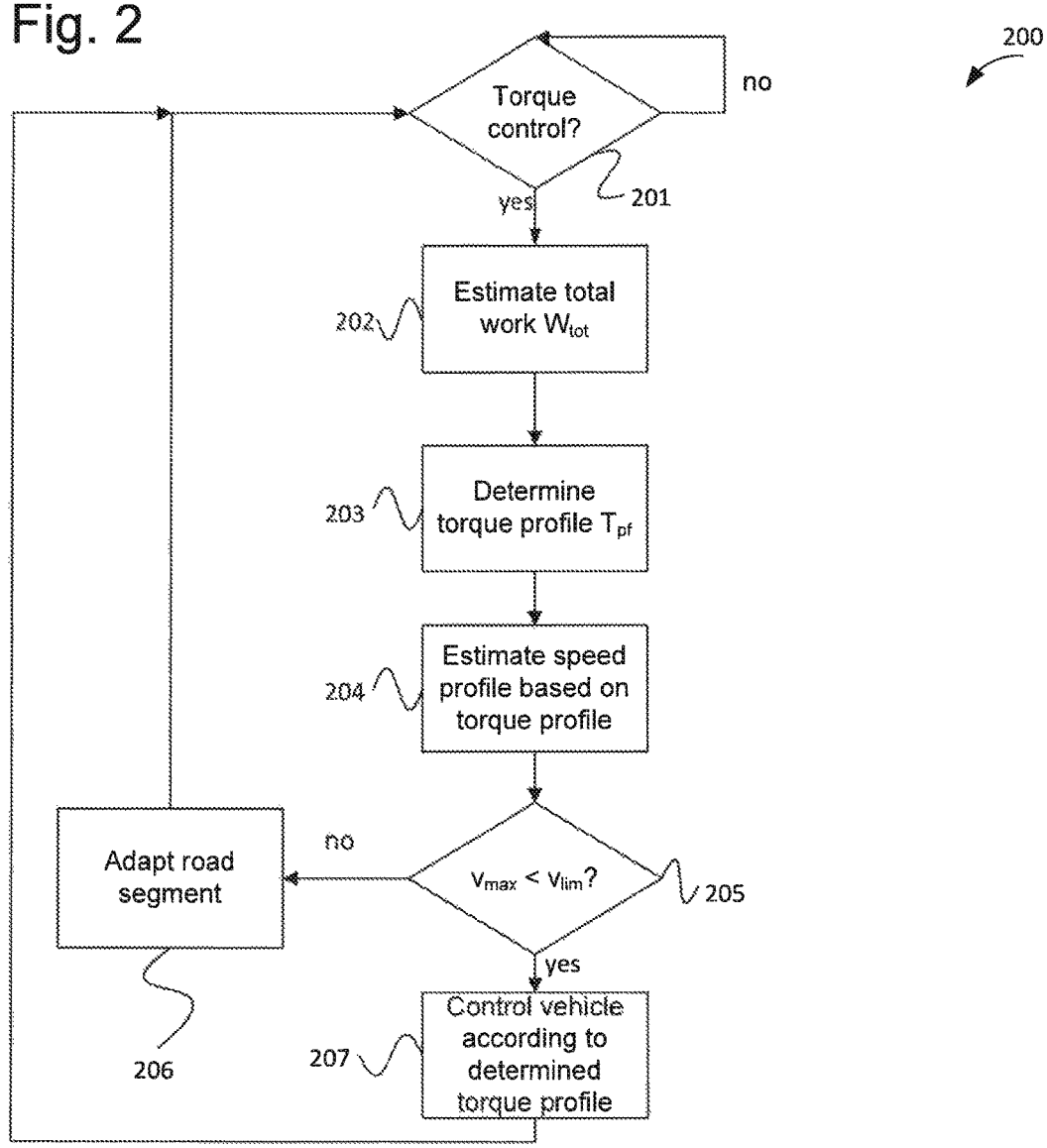
FIG. 2 shows an exemplary method according to the present invention.

The present invention relates, in particular, to a cruise control function that makes use of information regarding the road in front of the vehicle 100 when controlling the propulsion of the vehicle 100, and which controls the speed of the vehicle 100 in a different manner than prior art solutions. An exemplary method 200 according to the present invention is shown in FIG. 2, and the method starts in step 201 where it is determined whether the propulsion of the vehicle 100 is to be controlled by controlling torque according to the present invention. The invention is described below for an embodiment where the work to be produced by the vehicle power source is estimated, but the described method is equally applicable e.g. for estimating the average torque to be produced by the vehicle power source, or for estimating a torque profile when driving said vehicle along a segment of road at a set speed.

Further, according to one embodiment, the propulsion of the vehicle is controlled according to the present invention at all times, but, as will be explained below, there can also be situations in which the vehicle should be controlled according to some other cruise control function. For example, there can be sections of the road on which the vehicle is travelling where other kinds of control can be advantageous to use, e.g. from a fuel consumption perspective.

When the propulsion of the vehicle is to be controlled according to the present invention, the method continues to step 202. In step 202, the total work $W_{tot}$ that is to be produced by the combustion engine 101 during an upcoming segment of the road along which the vehicle 100 is travelling is estimated. This estimation can be performed e.g. using look ahead data and data relating to the vehicle, such as, e.g. current weight of the vehicle etc., where e.g. propulsion of the vehicle for the upcoming segment can be simulated, e.g. for a set cruise control speed, and the total work be determined from the simulation.

Estimations of this kind are well known to the person skilled in the art, e.g. in the context of look ahead cruise control functions. For example, the driving resistance that the vehicle is subjected to can be estimated using on-board data, and this has also been thoroughly described in the prior art. The driving resistance in combination with knowledge of the road segment ahead, e.g. with regard to knowledge of the road topography, curvature, properties, etc. allows the required work to be produced by the combustion engine 101 in order to maintain e.g. a set vehicle speed when travelling the road segment to be estimated with high accuracy. Consequently, instead of estimating speed profiles as in the prior art, the total work to be produced by the combustion engine during a road segment is estimated. The estimation of the total work $W_{tot}$ can, for example, be estimated for a vehicle speed that has been set by the driver using one or more cruise control functions.

When the estimated total work $W_{tot}$ to be produced during the upcoming road segment has been estimated in step 202, the method continues to step 203 where a torque profile for controlling the combustion engine 101 is determined. The length of the road segment for which the estimated total work $W_{tot}$ is determined can, for example, be a segment having a length of at least 50 m, 200 m or 500 m, or a length in time for the vehicle traversing the segment of at least 3 s, 10 s, or 30 s.

With regard to cruise control functions in general, such functions are used to control the speed of the vehicle. As has been explained above, propulsion of the vehicle according to the present invention is controlled in a different manner, where the propulsion is controlled primarily without regard to the vehicle speed but, instead, with regard to the torque being produced by the combustion engine 101.

In step 203 a torque profile $T_{pf}$ of the torque to be delivered by the combustion engine 101 is determined. That is, instead of determining the speed profile where, in general, the speed of the vehicle is kept substantially constant, the propulsion of the vehicle is controlled with regard to the delivered torque instead. In particular, the torque profile $T_{pf}$ determined according to the present invention is such that variations in the torque being delivered by the combustion engine are reduced at the expense of increased variations in speed of said vehicle. That is, the resulting vehicle speed becomes dependent of the torque being delivered by the combustion engine, and hence the vehicle speed is not used as control parameter. In other words, the vehicle speed is allowed to vary as a consequence of reducing the variations in torque that normally is a result from keeping a set speed.

According to one embodiment, the torque profile is determined such that the torque is kept constant, or substantially constant, or being restricted to be within limits about a set torque during the road segment. For example, the torque can be set to the average torque that will provide the estimated total work during the road segment. According to one example, the torque variations can be limited to be within some suitable percentage of the average torque, e.g. to average torque ±20% or average torque ±40%. The torque being kept constant, or torque variations being limited, will have the result that vehicle speed will vary with the road profile (crests and valleys etc.) in the road along which the vehicle is travelling. For example, the torque can be set to the average torque that will provide the estimated total work during the road segment.

The difference between a cruise control function controlling the propulsion of the vehicle 100 according to the present invention in comparison to cruise control functions of the prior art is disclosed further in detail in FIGS. 3A-E, which show an exemplary scenario for the propulsion of the vehicle 100, both according to the prior art and according to the present invention.

Figure 3A:
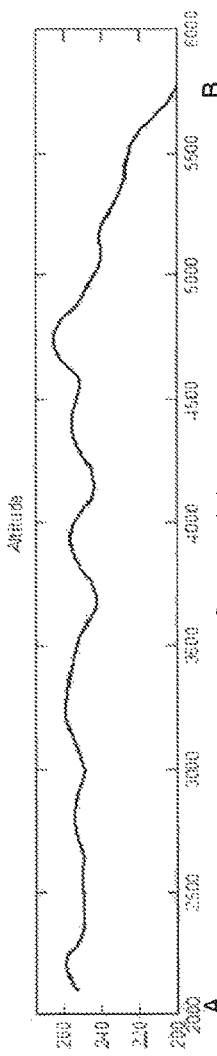
FIGS. 3A-E shows an exemplary scenario for the propulsion of a vehicle according to the present invention.

FIG. 3A shows a road (topography) profile of an exemplary section of a road. The Figure shows variations in altitude as a function of distance from a point A to a point B.

Figure 3B:
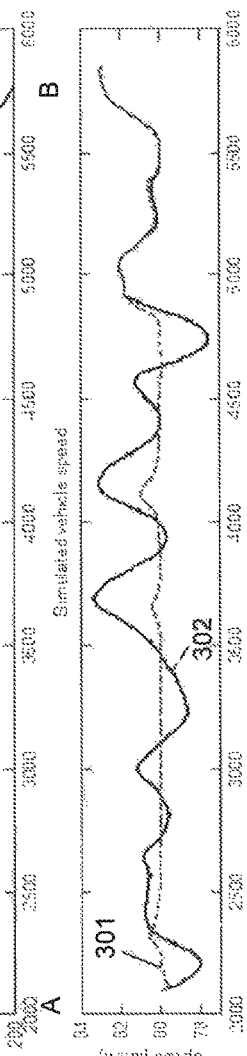

FIG. 3B shows a corresponding speed profile of the vehicle when travelling along the road segment showing in FIG. 3A. The speed profile of a conventional cruise control function is shown by dashed line 301. As can be seen from the Figure, the conventional cruise control function 301 aims at maintaining the vehicle speed at a set speed $v_{set}$ with only slight variations along most of the road segment. Usually, with regard to conventional cruise control functions, variations in vehicle speed occur primarily when driving uphill and downhill, where uphill driving may require vehicle speed to be reduced in order to provide enough power to clear the hill, and where the vehicle speed downhill may increase by the force of gravity. Look ahead cruise control functions can, for example, be arranged to allow the vehicle speed to be reduced somewhat when going uphill if the vehicle speed is likely to increase again to the set speed $v_{set}$ by the force of gravity in a following downhill slope.

Figure 3C:
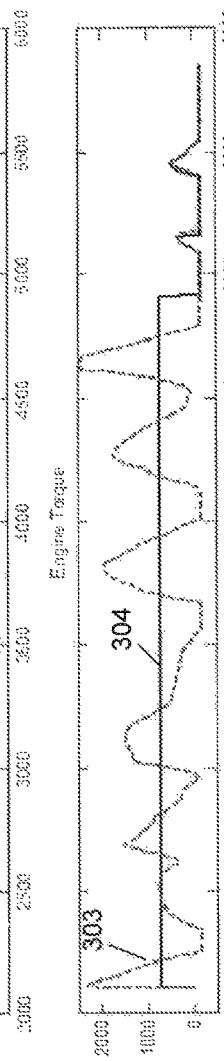

FIG. 3B also shows a corresponding speed profile when controlling propulsion of the vehicle 100 according to the present invention. This is illustrated by solid line 302. As can be seen, the variations in speed when controlling the propulsion of the vehicle 100 according to the present invention are considerably larger when compared to cruise control functions of the prior art. The variations are a consequence of the difference in controlling the combustion engine 101. This is illustrated in FIG. 3C where, again, dashed line 303 represents the conventional cruise control function and solid line 304 represents the cruise control function according to the present invention. FIG. 3C shows the torque being delivered by the combustion engine 101 as a function of distance and, as can be seen from FIG. 3C, the work produced by the combustion engine 101 is constantly varying, and with large variations, as the vehicle is travelling along the path when being controlled according to the prior art.

According to the cruise control function according to the present invention, on the other hand, the torque being delivered by the combustion engine 101 is kept at an essentially constant value for a large portion of the exemplary road section, i.e. for the segment up to a point C. According to the present example, and for reasons explained below, propulsion on the vehicle 100 according to the disclosed example is controlled according to the present invention up to point C, after which it is determined that some other cruise control strategy is more efficient from a fuel consumption point of view.

Figure 3D:
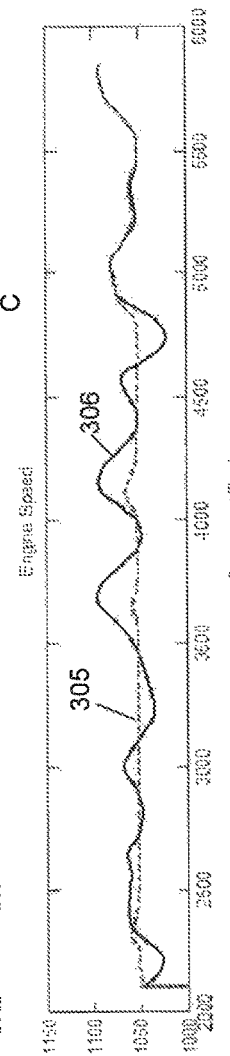

FIG. 3D discloses corresponding combustion engine speeds for the two different cruise control strategies. Again, control of the propulsion of the vehicle 100 according to the present invention, solid line 306, imposes considerably more variations in engine speed, reflecting the larger variations in vehicle speed above, as compared to the conventional control strategy, dashed line 305.

Figure 3E:
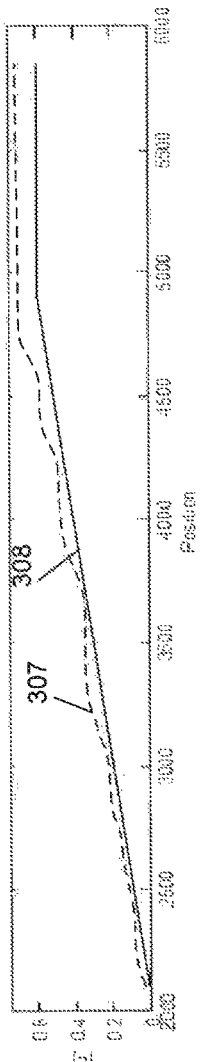

FIG. 3E shows the corresponding accumulated consumption of fuel when travelling from point A to B in FIG. 3A. Solid line 308 represents fuel consumption according to the control strategy of the present invention, and dashed line 307 represents fuel consumption according to the prior art cruise control function. According to the disclosed example, a control strategy according to the present invention consumes less fuel. Surprisingly, this result is obtained in spite of the larger variations in speed of the vehicle with, e.g., associated increase in air resistance resulting from increases in vehicle speed. The reason for the present invention being advantageous from a fuel consumption point of view is explained below with reference to FIG. 4. It is to be understood that the present invention is applicable also for vehicles where the propulsion of the vehicle is accomplished by means of an electrical machine. In this case similar variations as has been described above occur, and according to one embodiment solid lines of FIGS. 3A-E represent propulsion of the vehicle according to the present invention using an electrical machine, and where dashed lines represents propulsion using an electrical machine according to the prior art. FIG. 3E, in this case, would represent energy consumption rather than fuel consumption.

Figure 4:
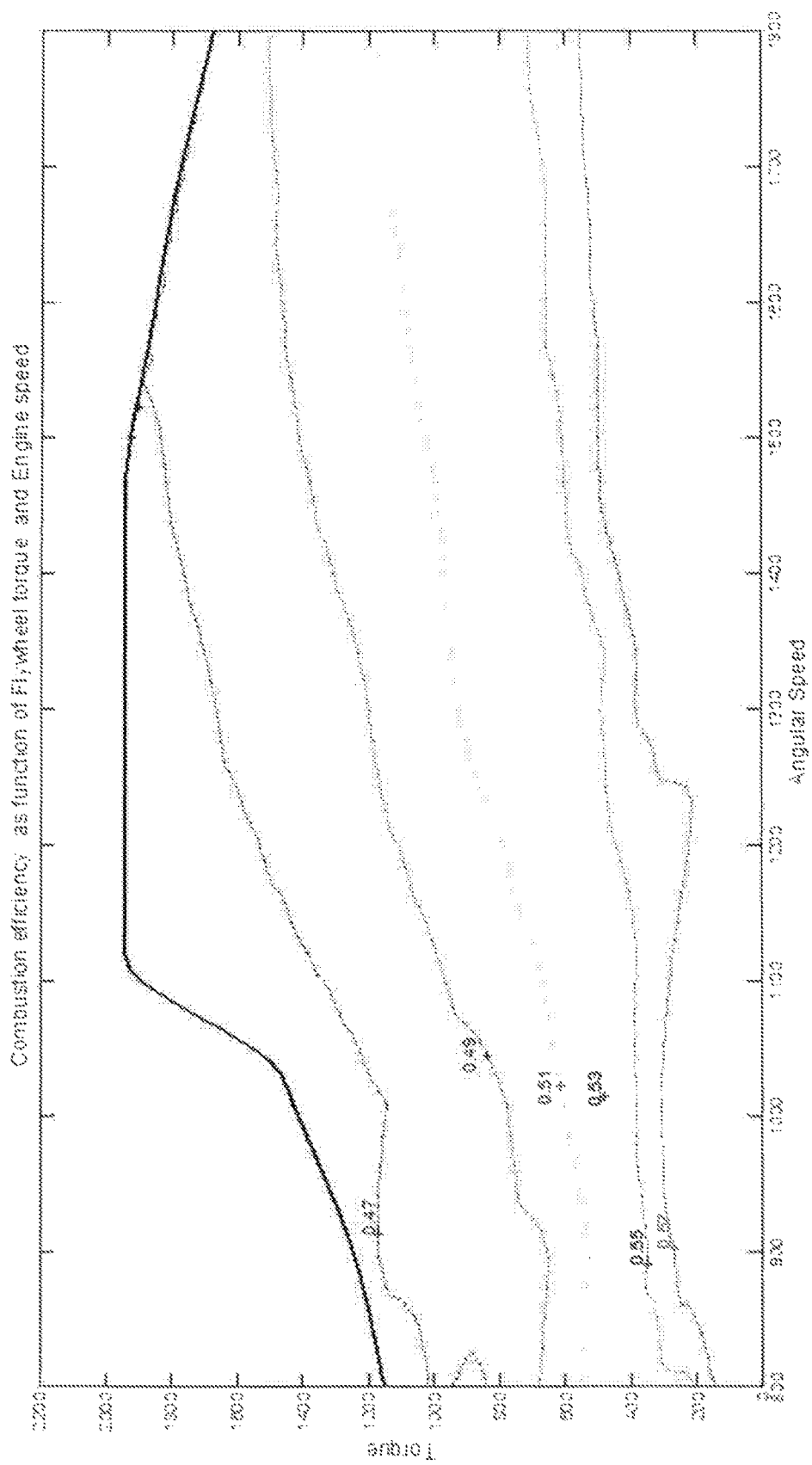
FIG. 4 shows a "combustion efficiency" map representing combustion engine efficiency in combination with vehicle drive train efficiency.

An exemplary "combustion efficiency" map is shown in FIG. 4. The y-axis represents produced torque and the x-axis represents engine speed. The various curves (0.47; 0.49; 0.51 etc.) represent efficiency levels where the higher the stated number, the higher the efficiency. With regard to "combustion efficiency", this can be defined as the efficiency of conversion of diesel energy to nominal mechanical energy in the engine, where nominal mechanical energy in this case is defined as the sum of measured mechanical energy of the flywheel and internal mechanical losses of the engine (e.g. friction and pump losses), As can be seen from FIG. 4, lower torques result in higher overall efficiency in the propulsion of the vehicle 100.

The present invention utilizes the consequences of FIG. 4 by keeping the torque constant to a higher extent and thereby at lower values in comparison to the situation where the torque is arranged to vary freely in order to maintain a constant speed. As can be seen from FIGS. 3A-E, the present invention provides a solution that, at least in some situations, provides a method for propulsion of the vehicle that reduces the consumption of fuel.

Further to FIG. 2, when a torque profile has been determined in step 203, the vehicle 100 can be arranged to be controlled according to the determined torque profile during the upcoming road segment, after which the method can be arranged to return to step 201, e.g. for determination of a torque profile of a next segment of road. According to one embodiment, instead, and as shown in FIG. 2, when the torque profile has been determined for a segment of road, a speed profile is calculated in step 204 based on the determined torque profile, where the estimated speed profile e.g. can be of the kind shown in FIG. 3C, in order to determine the maximum and/or minimum speeds that the vehicle will exhibit when being driven along the road segment according to the torque profile.

The speed profile can be estimated in a manner similar to the above in a straightforward manner using the torque profile determined from step 203, estimated driving resistance and road topography.

The speed profile can be used, for example, step 205, to determine if the maximum speed $v_{max}$ that the vehicle will reach during the road segment will exceed some speed limit $v_{lim}$ that the vehicle for some reason is not allowed to exceed. If this is the case, propulsion of the vehicle 100 according to the determined torque profile can be prohibited, or, alternatively, a new calculation can be performed e.g. for a shorter period of time and/or a shorter distance, e.g. by reducing the length of road segment by some suitable reduction factor, e.g. a percentage or segment length in terms of time, step 206, in order to determine if this would result in a speed profile that does not violate set criteria. According to one embodiment, it is determined, also or in the alternative, whether the minimum speed $v_{min}$ that the vehicle will exhibit during the road segment will go below some second speed limit $v_{lim2}$, and if so, the above measure with regard to the road segment can be taken.

According to one embodiment, if the resulting vehicle speed violates, or is expected to violate, set speed limit(s) a conventional cruise control algorithm can be arranged to take precedence to ensure that the speed e.g. does not exceed set limits in such situations, that is, the conventional cruise control function can be arranged to override vehicle propulsion according to the present invention if the vehicle speed deviates from the allowed speed range.

The allowed deviation in speed can, for example, be set to vary with the current vehicle speed. If the vehicle is being driven at higher speeds the negative impact of air resistance will be higher than the negative impact at lower speeds. Consequently, higher deviations, in particular with regard to increases in speed, can be allowed for comparatively lower speeds than comparatively higher speeds.

According to one embodiment, estimation and simulation is performed for a number of lengths (measured in time or distance) of the road segment where, following simulation, propulsion of the vehicle can be controlled according to the results of the longest segment for which certain criterion or criteria, e.g. with regard to the resulting vehicle speed, is/are still fulfilled. For example, propulsion of the vehicle can be controlled according to the results of the longest segment for which the estimated resulting vehicle speed does not exceed a maximum speed limit and/or does not fall below a minimum speed limit. Simulation can also be arranged to be performed for various torque levels, to determine a suitable level that fulfils the set criteria. For example, a first torque level can be used for a first part of the road segment, and a second torque level can be used for a second part of the road segment.

Propulsion of the vehicle according to the present invention can further be arranged to take other restrictions into account. For example, there may exist other modes of operation of the vehicle which, for certain types of road segments, are capable of reducing fuel consumption to a higher extent than being possible using the present invention. This can, for example, be the case with regard to downhill slopes where coasting, or free-wheeling, i.e. travelling with the combustion engine disconnected from the vehicle drive wheels, is advantageous.

According to one embodiment the propulsion of the vehicle according to the present invention can be used up to a point where coasting is preferable, which, for example, can be determined using a conventional look ahead cruise control function. In this case the method according to the present invention can be arranged to ensure that the vehicle speed, when reaching the point at which coasting is to begin, corresponds to the vehicle speed that the vehicle would exhibit had it been driven according to the conventional cruise control function.

For example, it can be determined, e.g. by estimation, whether or not the speed of the vehicle is expected to fulfil the desired condition at the position at which coasting is to begin, and the torque profile can then be determined such that the speed of the vehicle fulfils the desired condition at the desired position.

This can, for example, be accomplished by increasing vehicle speed at the end of the road segment if required. As a further example, a suitable compensation of the torque level to be used for the road segment can be performed, so that the vehicle speed at the end of the segment will correspond to the desired speed.

Consequently, the propulsion of the vehicle can be arranged to shift between cruise control strategies according to variations in the road along which the vehicle is travelling to benefit from different cruise control functions, where the particular cruise function that at present is most efficient can be used.

Furthermore, the method according to the invention can be arranged to be repeated at any suitable interval, such as e.g. every second or more or less often, so that the determined torque can be adapted slightly if required in dependence of differences between estimations and actual measurement and/or differences in the road segment for which estimation is being performed.

According to the above, the present invention provides a solution where the method for propulsion of the vehicle strives to reduce variations in torque delivered by the combustion engine at the expense of increased variations in vehicle speed.

So far, the present invention has been exemplified for a combustion engine. The invention is, however, equally applicable for use in vehicles being at least partly powered by an electrical machine. The combination of electrical machines and drive trains in vehicles can exhibit similar characteristics with regard to energy consumption as has been described with regard to fuel consumption above. Consequently, the present invention can be utilized to reduce energy consumption also in vehicles completely or partly utilizing electrical machines.

The invention claimed is:

1. A method for propulsion of a vehicle, said vehicle comprising at least one power source for providing power to at least one drive wheel of said vehicle, wherein said method includes, when said vehicle is to be driven along a first path:
   prior to said vehicle being driven along a first segment, determining a torque profile for use in controlling said first power source when driving said vehicle along at least said first segment of said first path;
   determining said torque profile on the basis of an estimated representation of a demand for torque when driving said vehicle along said first segment;
   when determining said torque profile, reducing variations in torque delivered by said power source by allowing increased variations in speed of said vehicle;
   when determining said torque profile, estimating an average torque demand when driving said vehicle along said first segment;
   determining said torque profile on the basis of said estimated average torque demand; and
   when said vehicle is driven along said first segment of said first path, controlling torque delivered by said at least one power source according to said determined torque profile.

2. A method according to claim 1, further comprising:
   determining said torque profile substantially as said estimated average torque.

3. A method according to claim 1, further comprising:
   determining said representation of a demand for torque when driving said vehicle along said first segment on the basis of topography information of said first segment of said first path.

4. A method according to claim 1, further comprising:
   estimating said representation of a demand for torque when driving said vehicle along said first segment by estimating a first work ($W_{tot}$) to be provided by said first at least one power source when driving said vehicle along said first segment of said first path.

5. A method according to claim 1, further comprising:
  determining said torque profile when said vehicle is controlled by a cruise control function being set to a first speed; and
  when determining said torque profile, reducing variations in torque delivered by said power source by allowing increased variations about said first set speed of said vehicle.

6. A method according to claim 1, further comprising including:
  estimating a maximum and/or a minimum speed of said vehicle when travelling said first segment; and
  controlling torque delivered by said at least one power source according to said determined torque profile only if said maximum speed is below a first speed limit ($v_{lim}$) and/or the minimum speed is above a second speed limit ($v_{lim2}$).

7. A method according to claim 1, further comprising:
  estimating the demand for torque to be provided by said first power source when driving said vehicle along said at least a first segment of said first path for a first vehicle speed.

8. A method according to claim 1, further comprising:
  estimating said demand for torque when driving said vehicle along said first segment by simulating driving said vehicle along said first segment at a first vehicle speed.

9. A method according to claim 7, said first vehicle speed being a set-speed of a cruise control function and/or a speed set by a driver of the vehicle.

10. A method according to claim 1, further comprising:
  determining said first torque profile such that said first power source delivers a substantially constant torque for at least part of said first segment.

11. A method according to claim 10, further comprising:
  determining a first torque level for a first part of said first segment, and a second torque level for a second part of said first segment.

12. A method according to claim 10, said first and second part, respectively, having a length of at least 50 m, 200 m or 500 m, or a length in time of at least 3 s, 10 s, or 30 s.

13. A method according to claim 1, further comprising:
  determining said first torque profile such that said first power source delivers a substantially constant torque that results in said estimated total work when said vehicle travels said first segment.

14. A method according to claim 1, further comprising:
  determining said first torque profile such that the torque variations during said first segment is limited to within: average torque ±20%, or average torque ±40%.

15. A method according to claim 1, further comprising:
  changing said first torque profile and/or said first segment while said vehicle is travelling along said first segment.

16. Computer program product comprising program code stored in a non-transitory computer-readable medium readable by a computer said computer program product used for propulsion of a vehicle, said vehicle comprising at least one power source for providing power to at least one drive wheel of said vehicle, said computer program code comprising computer instructions to cause one or more computer processors to perform the following operations when said vehicle is to be driven along a first path:
  prior to said vehicle being driven along a first segment, determining a torque profile for use in controlling said first power source when driving said vehicle along at least said first segment of said first path;
  determining said torque profile on the basis of an estimated representation of a demand for torque when driving said vehicle along said first segment;
  when determining said torque profile, reducing variations in torque delivered by said power source by allowing increased variations in speed of said vehicle;
  when determining said torque profile, estimating an average torque demand when driving said vehicle along said first segment;
  determining said torque profile on the basis of said estimated average torque demand; and
  when said vehicle is driven along said first segment of said first path, controlling torque delivered by said at least one power source according to said determined torque profile.

17. A system for propulsion of a vehicle, said vehicle comprising at least one power source for providing power to at least one drive wheel of said vehicle, wherein said system includes means for, when said vehicle is to be driven along a first path:
  prior to said vehicle being driven along a first segment, determining a torque profile for use in controlling said first power source when driving said vehicle along at least said first segment of said first path;
  determining said torque profile on the basis of an estimated representation of a demand for torque when driving said vehicle along said first segment;
  when determining said torque profile, reducing variations in torque delivered by said power source by allowing increased variations in speed of said vehicle;
  when determining said torque profile, estimating an average torque demand when driving said vehicle along said first segment;
  determining said torque profile on the basis of said estimated average torque demand; and
  when said vehicle is driven along said first segment of said first path, controlling torque delivered by said at least one power source according to said determined torque profile.

18. A vehicle comprise at least one power source for providing power to at least one drive wheel of said vehicle and a system for propulsion of the vehicle, wherein said system includes means for, when said vehicle is to be driven along a first path:
  prior to said vehicle being driven along a first segment, determining a torque profile for use in controlling said first power source when driving said vehicle along at least said first segment of said first path;
  determining said torque profile on the basis of an estimated representation of a demand for torque when driving said vehicle along said first segment;
  when determining said torque profile, reducing variations in torque delivered by said power source by allowing increased variations in speed of said vehicle;
  when determining said torque profile, estimating an average torque demand when driving said vehicle along said first segment;
  determining said torque profile on the basis of said estimated average torque demand; and
  when said vehicle is driven along said first segment of said first path, controlling torque delivered by said at least one power source according to said determined torque profile.

* * * * *